United States Patent
Uenoyama et al.

(10) Patent No.: US 7,082,165 B2
(45) Date of Patent: Jul. 25, 2006

(54) VIDEO COMPRESSION AND TRANSMISSION APPARATUS AND VIDEO COMPRESSION AND TRANSMISSION METHOD

(75) Inventors: Tsutomu Uenoyama, Kawasaki (JP); Atsushi Ando, Yokohama (JP); Yoshihiro Hayakawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 579 days.

(21) Appl. No.: 09/911,596

(22) Filed: Jul. 24, 2001

(65) Prior Publication Data
US 2002/0061138 A1 May 23, 2002

(30) Foreign Application Priority Data
Jul. 26, 2000 (JP) .................. P. 2000-225514
Jul. 19, 2001 (JP) .................. P. 2001-219866

(51) Int. Cl.
*H04N 7/12* (2006.01)
(52) U.S. Cl. ............ 375/240.16; 375/240; 375/240.01; 375/240.12
(58) Field of Classification Search ................ 375/240, 375/240.01, 240.03, 240.12, 240.16, 240.23, 375/240.29, 240.15; 370/471, 468
See application file for complete search history.

(56) References Cited

U.S. PATENT DOCUMENTS

| | | | | |
|---|---|---|---|---|
| 5,136,376 A | * | 8/1992 | Yagasaki et al. | 375/240.23 |
| 5,537,409 A | * | 7/1996 | Moriyama et al. | 370/471 |
| 5,638,129 A | * | 6/1997 | Lee | 375/240.16 |
| 5,640,388 A | * | 6/1997 | Woodhead et al. | 370/468 |
| 6,115,421 A | * | 9/2000 | Katta et al. | 375/240 |
| 6,466,625 B1 | * | 10/2002 | Kobayashi et al. | 375/240.29 |
| 6,477,202 B1 | * | 11/2002 | Takeuchi et al. | 375/240.15 |

FOREIGN PATENT DOCUMENTS

| | | |
|---|---|---|
| JP | 9-116902 | 5/1997 |
| JP | 10-32803 | 2/1998 |

\* cited by examiner

*Primary Examiner*—Allen Wong
(74) *Attorney, Agent, or Firm*—Pearne & Gordon LLP

(57) ABSTRACT

The video compression transmission apparatus comprises a video input unit for inputting pictures, a video compression unit for compressing input pictures, a video transmission unit for transmitting compressed pictures via a communication line, and a controller for controlling operation of each unit. Video compression via a video compression unit and video transmission via a video transmission unit are performed in parallel. Video compression method via the video compression unit and video transmission method via a video transmission unit are controlled by the controller so that each processing time becomes about the same.

4 Claims, 9 Drawing Sheets

VIDEO COMPRESSION AND TRANSMISSION APPARATUS AND VIDEO COMPRESSION AND TRANSMISSION METHOD

BACKGROUND OF THE INVENTION

The present invention relates to a video compression transmission method and video compression transmission apparatus for compressing a digital video signal and transmitting the compressed digital video signal via a network, and in particular to a video compression transmission method and video compression transmission apparatus preferable in case compression of a digital video signal and transmission of the digital video signal requires time exceeding a normal video reproduction time.

A TV program is important as a unit for news reporting. News reporting in a TV program can explain the situation of the news spot via pictures and thus enhances the reliability of the news reporting. In order to provide such news reporting, a mechanism for shooting moving pictures of the news spot for use in a program is required. Such a mechanism is here in called a news video collection system.

Related art news video collection systems are roughly divided into two types. The first system is a live video collection system that utilizes collected video materials immediately after they are shot as news materials. Outline of the live video collection system will be described referring to FIG. 14. FIG. 14 shows the outline of a live video collection system. This system requires shooting apparatus for shooting moving pictures and temporarily recording the pictures if necessary and a transmitter for transmitting the shot and/or recorded pictures to a broadcast station. A broadcast station for processing/editing pictures and creating news programs requires apparatus for receiving pictures from news spots and apparatus for storing/utilizing the received pictures. Video correction in this system includes steps of 1) shooting moving pictures, 2) recording shot pictures if necessary, 3) transmitting the shot and recorded pictures via communication lines, and 4) receiving the pictures at a broadcast station and utilizing the pictures as news materials. The system can transmit pictures in real time so that it is possible to immediately use pictures shot at a news spot in the broadcast station to perform live broadcasting.

However, this system is disadvantageous in that it requires apparatus for transmitting pictures in real time thus requiring a large-scale system. A general transmitter used in the system is an outside broadcast van provided with a satellite communications facility in a single dedicated vehicle. The rebroadcast vehicle selects as required high-quality pictures from a plurality of cameras or video recorders, and after a simple process, transits the resulting pictures via analog or digital satellite communication links. Thus, in order to utilize an outside broadcast van, a plurality of specialists with expertise are required for operation. Preparation work such as making available satellite communication lines is burdensome before starting transmission of pictures. Further, a broadcast station as a receiving side requires operators with expertise.

The live video collection system is advantageous in that it can immediately utilize pictures on news spots; it is disadvantageous in that preparation work is on a large scale such as providing a news spot with a large transmission facility and a plurality of operators thus reducing the mobility. Another disadvantage is large costs for collection of news pictures.

The second news video collection system is a tape-based video collection system for transmitting pictures via video tapes. Outline of the tape-based video collection system will be described referring to FIG. 15. FIG. 15 shows the outline of a tape-based video collection system. In this system, only the apparatus for shooting moving pictures and recording the pictures onto video tapes is required. The broadcast station requires apparatus for reproducing video tapes recorded on a news spot. News video correction in this system includes steps of 1) recording pictures onto video tapes on a news spot, 2) carrying the recorded video tapes into a broadcast station, and3) creating a news program using the video tapes in a broadcast station. As understood from this explanation, the tape-based video collection system requires a video camera capable of recording onto video tapes and a operator that records video pictures on a news spot.

In this way, the tape-based video collection system allows collection of news pictures with a smaller facility and a smaller number of operators, thus upgrading the mobility and reducing collection costs. On the other hand, recorded video tapes must be carried into a broadcast station thus impairs quick reporting.

In the related art, the former live video collection system has been often used in large-scale news collection such as a nationwide broadcast of a major case. The latter tape-based video collection system has been used in collecting local news and reporting detailed news.

In recent years, nationwide broadcasts to report major cases with large facilities and broadcasts to report a variety of smaller-scale, more detailed news have been used in a mixed way. Thus, in a large-scale news reporting also, the first report should be quick enough and variety is needed in news reporting thus emphasizing the mobility. In a small-scale news reporting, broadcasting collected news materials quickly is more and more important.

Thus, there is a growing need for a news video collection system that can improve the mobility while maintaining high picture quality and without impairing quick reporting thus reducing collection costs.

SUMMARY OF THE INVENTION

The invention aims at providing at a low cost video compression transmission apparatus that improves quick reporting while maintaining mobility. The invention also aims at video compression transmission apparatus that can change the processing method depending on the transmission speed on communication lines and arithmetic operation performance of apparatus, thus upgrading the picture quality.

Video compression transmission apparatus of the invention comprises a video compression unit for performing compression encoding on an input digital video signal, a video transmission unit for transmitting to outside the signal compression-encoded by the video compression unit via a communication line, and a controller for controlling the operation of the video compression unit and the video transmission unit, the video compression unit and the video transmission unit operating in parallel. At least either the compression encoding method via the video compression unit or the transmission method via the video transmission unit can be changed by the controller.

Change in the compression encoding method via the video compression unit includes at least either change in the compression ratio of pictures or change in the video compression encoding details. Change in the video compression encoding includes at least either change in the motion vector exploration method or change in the type of filters applied to pictures and presence/absence of filters.

The controller changes at least the compression encoding method via the video compression unit or the transmission method via the video transmission unit depending on the set conditions for a video signal to be compression-encoded.

Video compression transmission apparatus of the invention further comprises a processing time measuring unit for measuring the compression encoding time via the video compression unit and the transmission time via the video transmission unit, the controller changing at least either the compression encoding method via the video compression unit or the transmission method via the video transmission unit depending on the set conditions and the output of the processing time measuring unit.

DETAILED DESCRIPTION OF THE PREFERRED EMBODIMENT

Embodiments of the invention will be described referring to FIGS. 1 through 13.

FIRST EMBODIMENT

Figure 1:
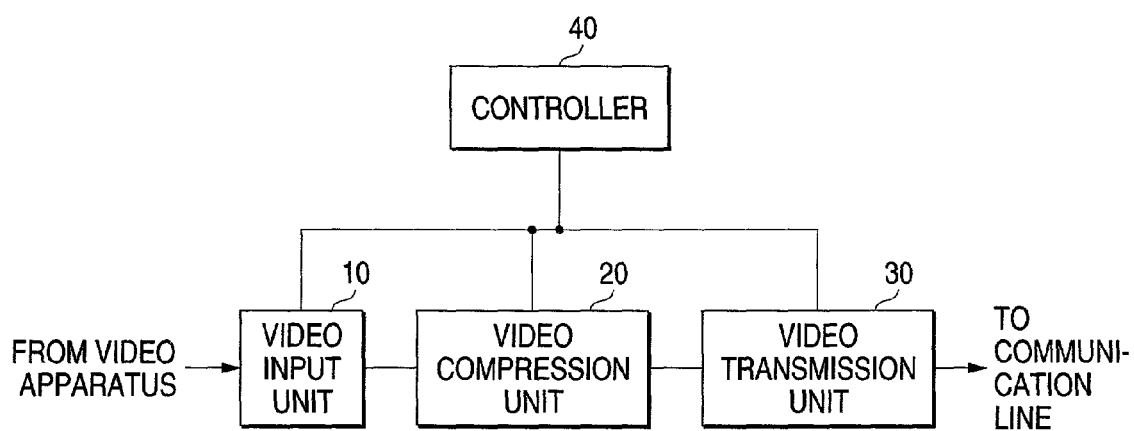
FIG. 1 is a general block diagram of the first embodiment.
Figure 2:
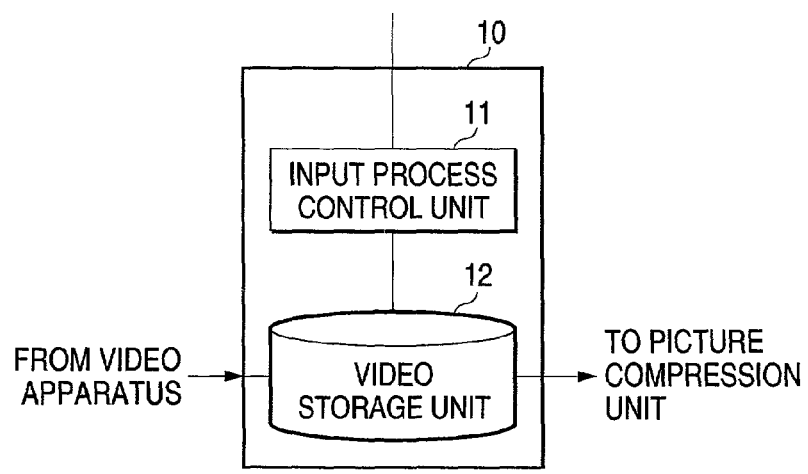
FIG. 2 is a general block diagram of an example of a video input unit.
Figure 3:
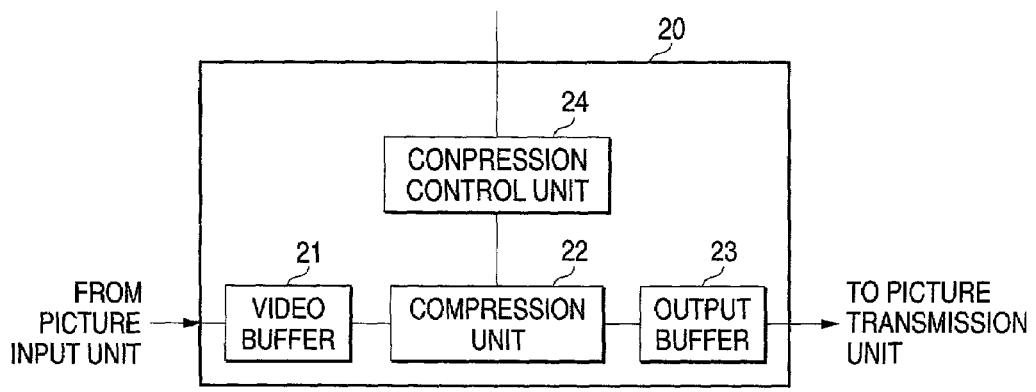
FIG. 3 is a general block diagram of an example of a video compression unit.
Figure 4:
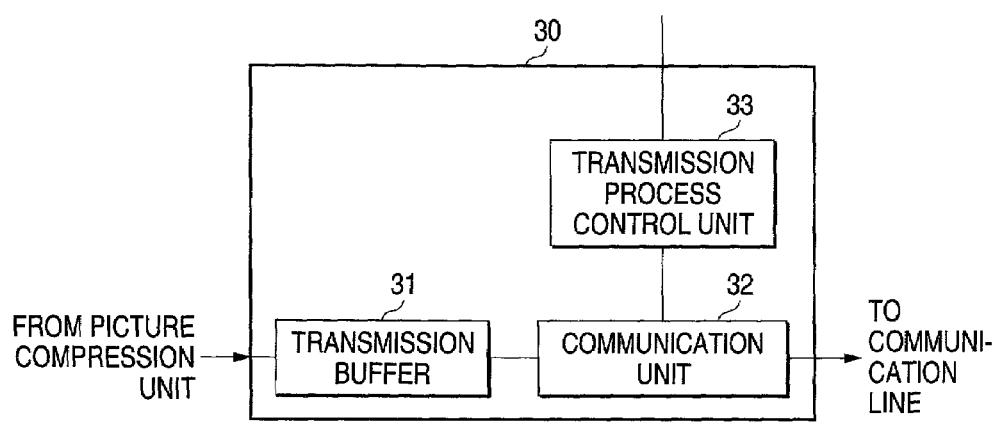
FIG. 4 is a general block diagram of an example of a vide transmission unit.

FIG. 1 is a general block diagram of video compression transmission apparatus according to the first embodiment of the invention. FIGS. 2 through 4 show detailed configuration of some of the components in FIG. 1. Video compression transmission apparatus in FIG. 1 comprises a video input unit 10 for inputting pictures, a video compression unit 20 for compressing input pictures, a video transmission unit 30 for transmitting compressed pictures via a communication line, and a controller 40 for controlling operation of each unit. The video compression transmission apparatus inputs a digital video signal from video apparatus in the video input unit 10, performs compression encoding in the video compression unit 20 and transmits a compression-encoded picture signal via a communication line in the video transmission unit 30. Video compression transmission apparatus in FIG. 1 operates in non-real time for transmitting pictures via a low-speed ISDN communication line. Assuming the bit rate of a picture to be compressed as 3 Mbps and transmitting the picture over 2B lines (128 kbps, effective transmission speed: 100 kbps), the time required for transmission of the compressed picture is 30 times longer than the reproduction time (real time) of the picture. Thus, compression transmission operation can be covered by the throughput of a portable personal computer.

FIG. 2 is a general block diagram of an example of a video input unit 10. The video input unit 10 comprises a video storage unit 12 connected to video apparatus such as a video camera and a video tape recorder, the video storage unit 12 storing a digital video signal from video apparatus and an input processing control unit 11 for controlling storage of a video signal and transmission to a video compression unit 20.

FIG. 3 is a general block diagram of an example of a video compression unit 20. The video compression unit 20 comprises a video buffer 21, a compression unit 22, an output buffer 23, and a compression control unit 24. The video buffer 21 temporarily stored a digital video signal from the video input unit 10 per predetermined volume. The predetermined volume is a unit by which the compression unit performs batch compression and one frame and one GOP (Group Of Picture, unit of picture specified by MPEG). Hereinafter such a unit is called a "group".

Figure 5:
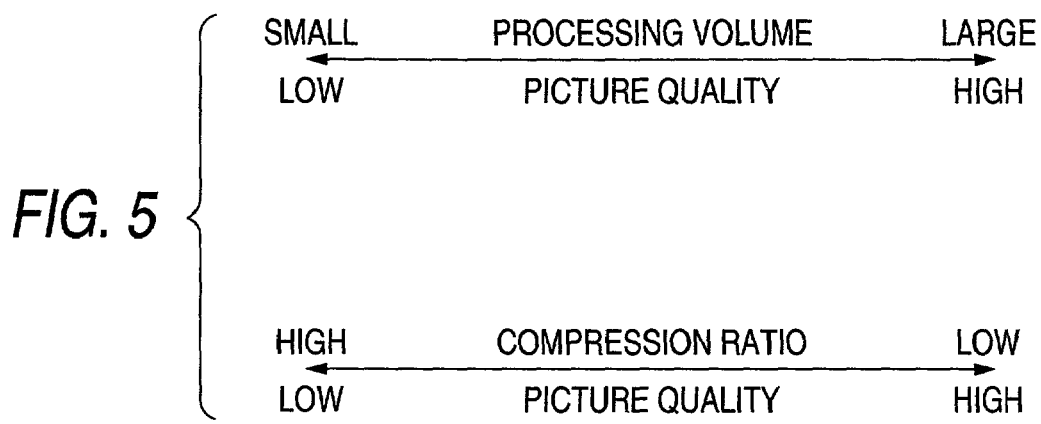
FIG. 5 explains the compression method and picture quality.

The compression unit 22 performs compression per group and is controlled by compression control unit 24. Compression method via the compression unit is instructed by a controller 40. In particular, for example the compression ratio and compression details are instructed. Changing the compression ratio and compression details can adjust the quality of the compressed picture obtained. As shown in FIG. 5, increasing the number of motion vector explorations for volume compression at a motion estimation, filtering in preprocessing, or performing adaptive filtering obtains a high-quality compressed picture but results in increased compression time. Raising the compression ratio reduces the output bit rate thus shortening the transmission time but results in degraded picture quality.

The output buffer 23 temporarily stores compressed pictures obtained by the compression unit 22 and sends the pictures to the vide transmission unit 30.

FIG. 4 is a general block diagram of an example of a video transmission unit 30. The video transmission unit 30 comprises a transmission buffer 31 for temporarily storing the compressed pictures until they are actually transmitted over a communication line, communications unit 32 for transmitting compressed pictures over a communication line, and a transmission control unit 33 for controlling the communications unit. The transmission buffer retains pictures compressed per group. The pictures are transmitted over a communication line by the communications unit 32.

The controller 40 controls the entire video compression transmission apparatus in FIG. 1. Via a setting unit not shown, the allowable range of the transmission rate of compressed pictures or required transmission time and the allowable range of the picture quality are specified. The picture quality varies with the compression ratio and compression details as shown in FIG. 5, so that setting of a plurality of stages is allowed as combinations of a compression ratio and compression details corresponding to individual stages are previously stored.

Figure 6:
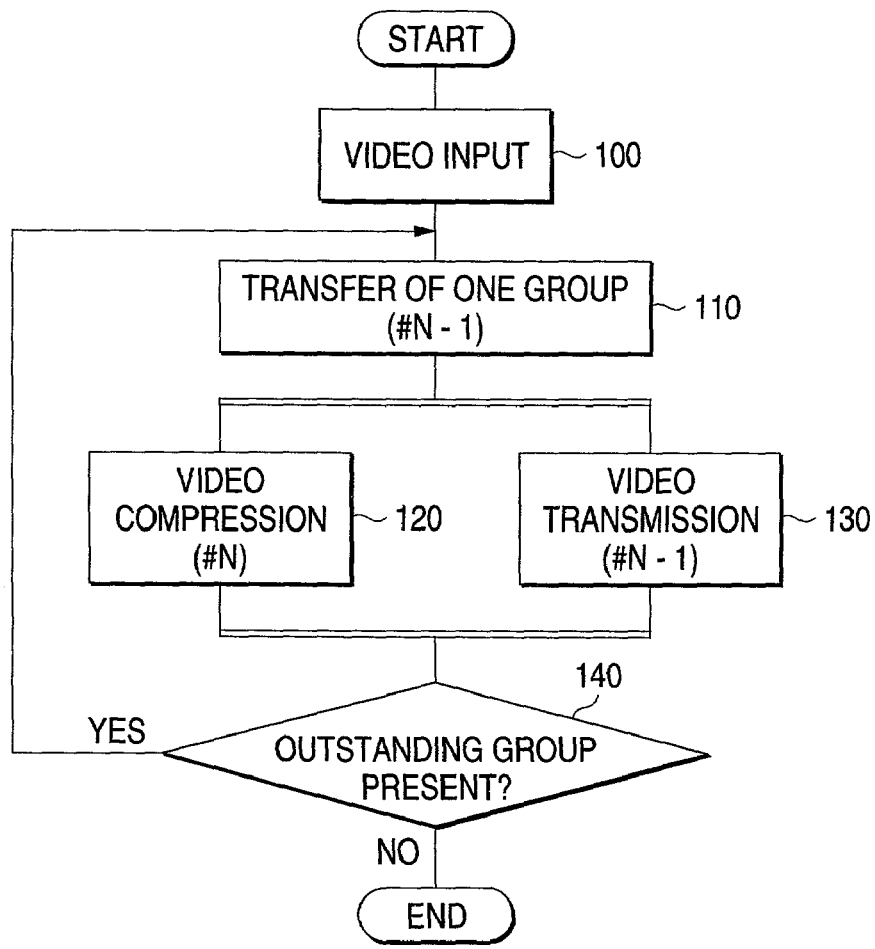
FIG. 6 is a flowchart of the entire operation according to the first embodiment.
Figure 7:
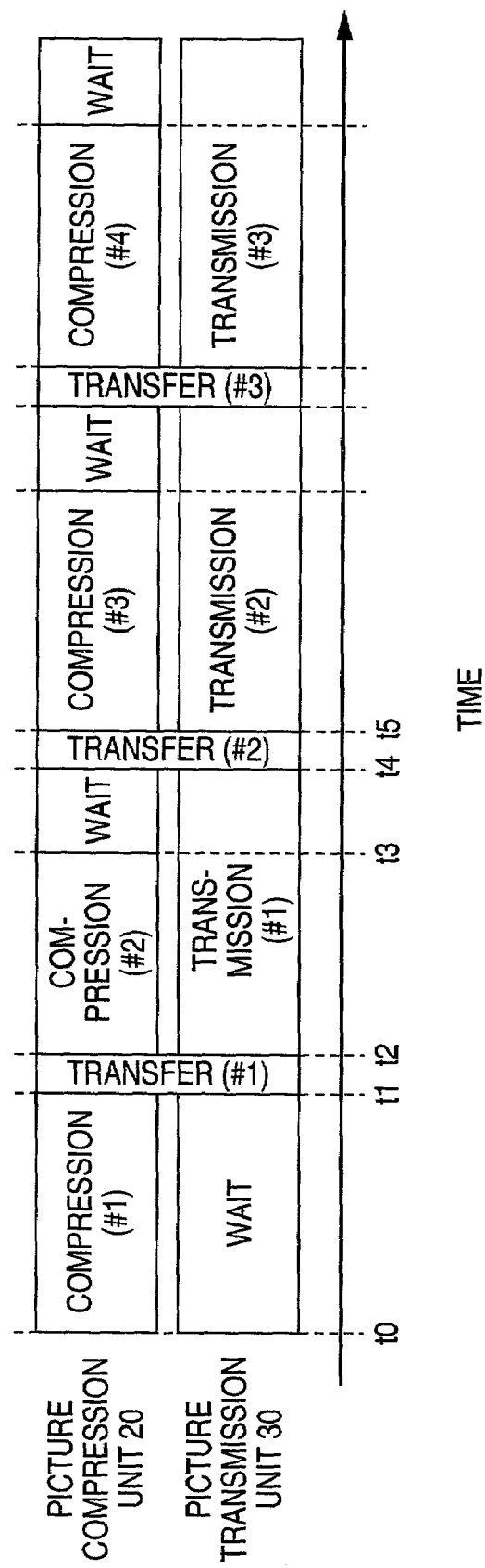
FIG. 7 is a time chart of video compression and video transmission according to the first embodiment.

Next, operation of video compression transmission apparatus in FIG. 1 will be described. FIG. 6 is a flowchart showing the flow of operation of this apparatus. FIG. 7 is a corresponding time chart. Here, it is assumed that the time required for transmission of pictures is longer than the time required for compression. The transmission rate of compressed pictures, that is, the ratio of transmission time to the real time and the picture quality are set and processing starts. In Step 100, the video input unit 10 input a picture from video apparatus and stores the picture in a video storage unit 12. A video compression unit 20 takes the first group into a video buffer 21.

Step 110 transfers the contents of an output buffer 23 to a transmission buffer 31. In the first stage, the output buffer contains no data so that no processing is done. Video compression via compression unit 22 in Step 120 and video transmission via communications unit 32 in Step 130 are performed in parallel. At first, the communications unit 32 is in the wait state because the transmission buffer 31 contains no data. Video compression in Step 120 performs compression via a processing method set in a controller 40 (time t0).

In Step 140, it is determined whether outstanding blocks are present. In case present, execution returns to Step 110 and contents of the output buffer 23 are transferred to the transmission buffer 31 (time t1). Simultaneously, the next group is transferred from a video storage unit 12 to a video buffer 21. Step 120 and Step 130 are performed in parallel (time t2 ). In this case, the transmission buffer contains data so that the communications unit 32 transmits the data over a communication line.

Transmission takes longer time than compression so that processing is placed in wait state after compression is competed at time t3. The video data contains no outstanding data. Next group to be processed are transferred from the video storage unit to the video buffer 21. After that, the same processing is repeated.

The time chart in FIG. 7 will be further described. At time t0, a video signal of the first group #1 is compressed in the video compression unit 20. The video transmission unit 30 is placed in the wait state because there is no data to be transmitted. When compression of the first group #1 is complete at time t1, the compressed picture of the first group #1 is transferred from the video compression unit 20 to the video transmission unit 30.

When transfer of the first group #1 is complete at time t2, the video transmission unit 30 starts transmitting the data of the first group #1 over a communication line. At the same time, the video compression unit 20 start compression of the second group #2 as a next group. At time t3, compression of the second group #2 is complete. It is assumed that the time required for transmission is longer than the time required for compression, so that transmission of the first group #1 is not complete at time t3 and the video compression unit 20 is placed in the wait state.

At time t4, transmission of the first group is complete, and at the same time, the already compressed second group #2 is transferred from the video compression unit 20 to the video transmission unit 30. At time t5, the video compression unit 20 starts compression of the third group #3, and at the same time, the video transmission unit 30 starts transmission of the second group #2. After that, the same processing is repeated.

Figure 8:
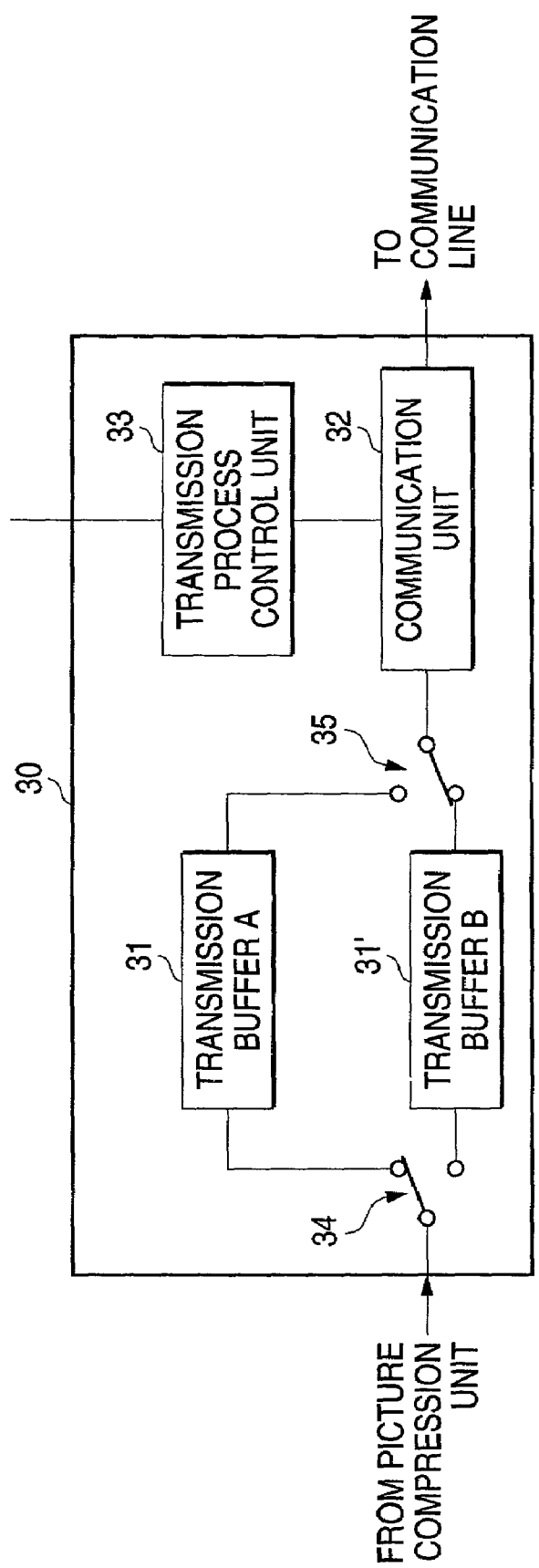
FIG. 8 is a general block diagram of another example of a video transmission unit.

Instead of transferring a compressed video signal from the output buffer 23 of the video compression unit 20 to the transmission buffer 31 of the video transmission unit 30, the output buffer 23 and the transmission buffer 31 may be used for double duty. FIG. 8 is a general block diagram of another example of a video transmission unit. By providing video transmission unit 30' with transmission buffers 31, 31' for two groups and alternating switches 34, 35, it is possible to access both the output buffer 23 and the transmission buffer 31 thus it is possible to use the output buffer 23 as the transmission buffer 31 also. Via this configuration, transfer of a compressed video signal is made unnecessary thus reducing the processing time.

Setting of the transmission rate of compressed pictures, that is, the ratio of transmission time to the real time and the picture quality, and compressed pictures to be transmitted and the transmission time will be further described. From the allowable value of transmission rate and temporary transmission capability of the video transmission unit 30 (typically a less expensive lower transmission capability is selected), the time required for transmission of a single block is calculated. Selecting a compression method to allow compression within the calculated time among the compression methods to satisfy the specified picture quality allows compression transmission satisfying the set conditions. In case a method to allow compression within the calculated time is not found, the transmission capability of the video transmission unit 30 is changed and the same processing is repeated.

The time required for compression depends on the processing volume of compression and performance of arithmetic operation apparatus to perform compression. At the same bit rate, the more the processing volume and the more complicated the compression, the more time is required but the better picture quality is obtained. The time required for video transmission depends on the bit rate and transmission speed. The higher the bit rate, the better picture quality is obtained but the more time is required for video transmission. Thus, in case the performance of the arithmetic operation apparatus and the transmission speed are fixed, it is possible to obtain desired picture quality and transmission time by controlling the processing volume of compression and the bit rate.

In case a picture of a high quality is transmitted, setting a large bit rate and performing complicated compression upgrades the picture quality. For example, in case the transmission speed is set to 100 kbps and the upper limit of the bit rate predetermined for the apparatus is set to 5 Mbps, the transmission time is 50 times as long as the picture reproduction time T. Because compression should be performed within this transmission time, it is possible to perform substantially complicated compression. In this case, it is possible to upgrade the picture quality by increasing the bit rate and performing complicated compression.

In case the user places emphasis on the short transmission time, the apparatus selects the optimum compression system based on the specified transmission time. Described below is a case where video transmission is performed in the shorted transmission time. Assuming that the transmission speed is 100 kbps and the lower limit of the transmission time is five times as long as the picture reproduction time, the bit rate is calculated as 500 kbps. Compression should be made within the transmission time (five times as long as the picture reproduction time) so that it uses a simple processing. Via this approach, a desired transmission time is obtained.

Figure 9A:
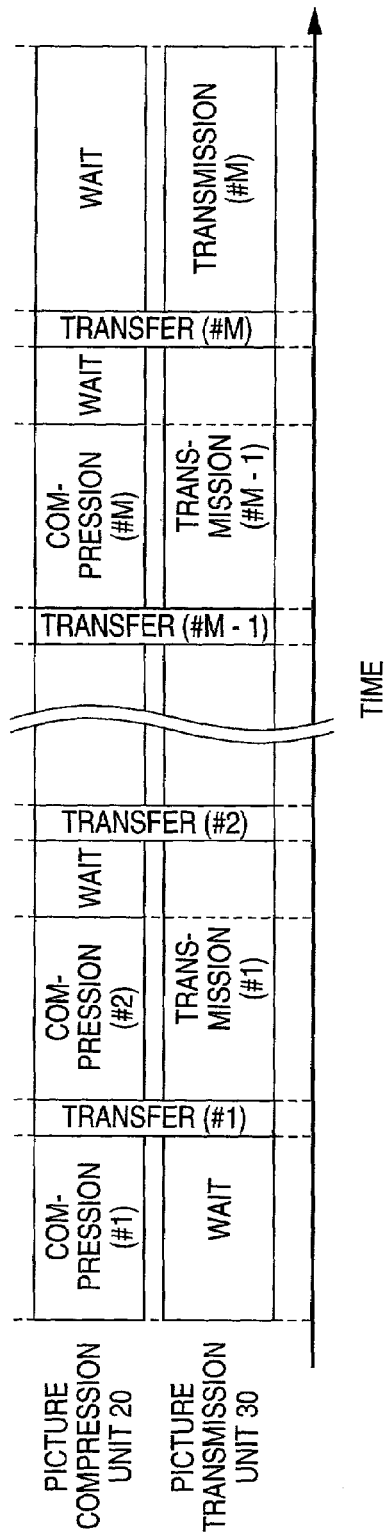
FIG. 9A is a time chart of video compression and video transmission with high picture quality.
Figure 9B:
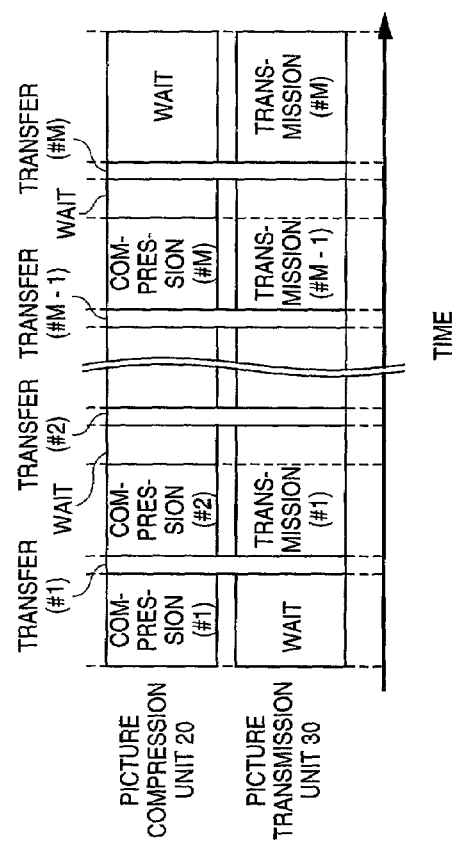
FIG. 9B is a time chart of video compression and video transmission in case where the video is to be transmitted in short time.

FIG. 9A shows a time chart of operation of video compression transmission apparatus in a case where the picture quality is emphasized. FIG. 9B shows a time chart of operation of video compression transmission apparatus in a case where the transmission time is emphasized. As shown in FIGS. 9A and 9B, both the compression time and the transmission time are long in the case where the picture quality is emphasized, while both the compression time and the transmission time are short in the case where the transmission time is emphasized.

Next, setting of compression processing will be described. Here, a case where the user specifies the transmission time and sets compression processing will be described. When the user starts setting, the apparatus obtains the environment including the transmission speed (network bandwidth) and the reproduction time of a target picture. Assume that the transmission speed is 100 kbps and the picture reproduction time is five minutes. Then, the apparatus calculates the selection range of the transmission time. In this practice, the selection range is calculated based on the upper limit and lower limit of the bit rate predetermined for the apparatus. Assuming that the upper limit of the bit rate is 5 Mbps and the lower limit is 500 kbps, the selection range of the transmission time is 250 to 25 minutes. The user specifies the transmission time within this selection range. The apparatus determines the bit rate and the compression details based on the specified transmission time, then performs compression. The user may display the picture that is based on the determined compression details via preview feature in order to check the quality of the picture to be transmitted. While the user specifies the transmission time in this example, the user may specify the picture quality and bit rate.

Figure 10:
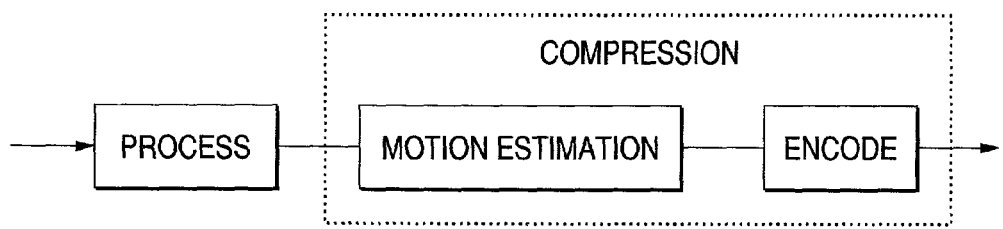
FIG. 10 represents the outline of the operation of the video compression.

Next, the flow of compression processing will be described. As shown in FIG. 10, preprocessing is performed on the input picture. The preprocessing determines the complexity of a picture and reduces the complexity of processing. After that, motion estimation is made and the input picture is encoded. For a complicated picture, preprocessing is meticulously made to facilitate motion estimation, while preprocessing is simplified for a less complicated picture to perform motion estimation adequately. Preprocessing may be omitted. The apparatus selects the optimum compression processing based on the target picture and the specified time.

While the time required for video transmission is longer than the time required for video compression in the foregoing example, the video compression transmission apparatus is effective also in case the time required for video transmission is shorter and in case the time required for video transmission is identical with the time required for video compression.

As described earlier, according to this apparatus, it is possible to reduce the operation performance required of the apparatus without increasing the time required for video compression and video transmission thereby reducing the apparatus scale. Reducing the apparatus scale downsizes the and making lightweight the entire apparatus or increases battery duration via reduced power consumption. Such advantages are in particular practically efficient in case the apparatus is used in a news video collection system that requires mobility.

SECOND EMBODIMENT

Second embodiment of video compression transmission apparatus of the invention eliminates the need for storing digital pictures before compression. Basically, the configuration of the second embodiment is the same as that of the first embodiment, except for the configuration of the video input unit.

Figure 11:
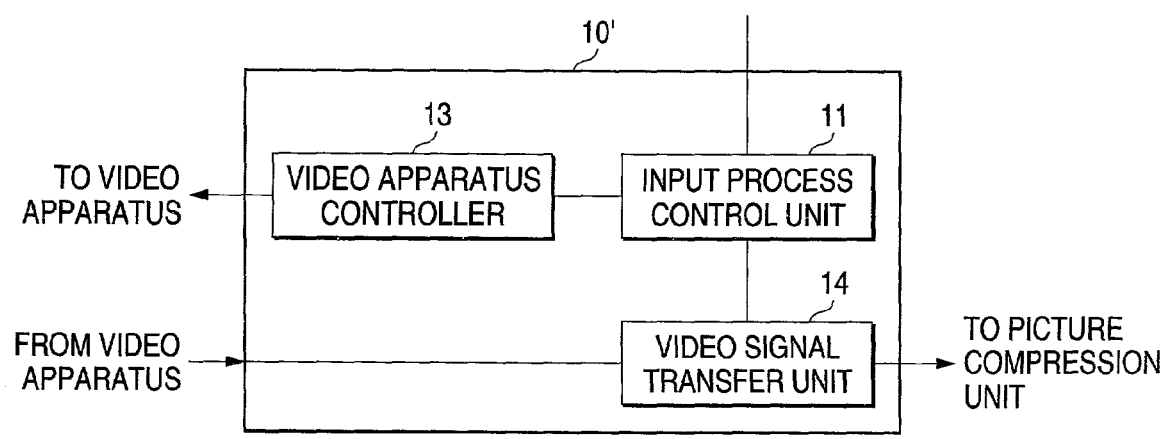
FIG. 11 is a general block diagram of another example of a video input unit.

FIG. 11 is a general block diagram of a video input unit according to the second embodiment. The video input unit 10' differs from the video input unit 10 shown in FIG. 2 in that it does not have a video storage unit 12 and it comprises a video apparatus controller 13 and video signal transfer unit 14. The video apparatus controller 13 has a feature for controlling the operation of video apparatus connected to this apparatus. The video compression transmission apparatus of this embodiment can be connected with a video apparatus for reproducing previously recorded pictures that allows apparatus control such as reproduction and stop per group from an external control signal. The video signal transfer unit 14 transfers a group-based video signal from video apparatus to the video buffer 21 of the video compression unit 20.

Figure 12:
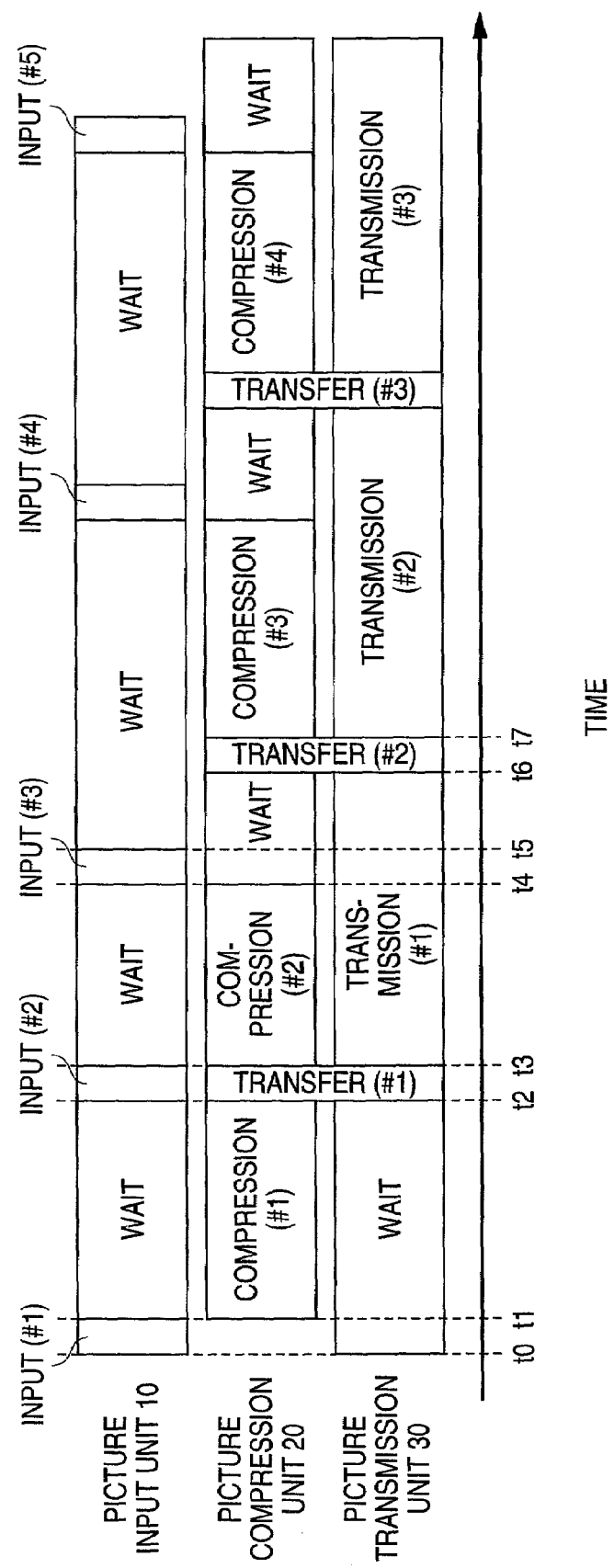
FIG. 12 is a time chart of video compression and video transmission according to the second embodiment.

Next, operation of video compression transmission apparatus according to the second embodiment will be described. FIG. 12 is a time chart showing the flow of operation of this apparatus. The transmission rate of compressed pictures and the picture quality are set and processing starts. At time t0, a video input unit 10' operates external video apparatus and transfers a video signal of a single group to a video buffer 21 of a video compression unit 20. This processing is based on an input instruction transmitted from a controller 40 to the video apparatus controller 13 via input processing control unit 11. The video apparatus controller 13 transmits a control signal to start reproducing the first group (#1). The reproduced video signal is transmitted to a video buffer 21 via the video signal transfer unit 14. At this time, a video compression unit 22 and a video transmission unit 30 are in the wait state.

When input of the first group (#1) is complete at time t1, an instruction to start compression of pictures in the first group (#1) is given to the video compression unit 20. When compression of the first group (#1) is complete at time t2, the contents of an output buffer 23 are transferred to a transmission buffer 31.

At time t3, transmission of compressed pictures of the first group (#1) and compression of pictures of the second group (#2) start simultaneously. When compression of the second group (#2) is complete at time t4, an instruction to wait is given to the video compression unit 20. Simultaneously an instruction to input pictures of the third group (#3) is given to the video input unit 10. When input of the pictures of the third group (#3) is complete via the video input unit 10 at time t5, the video input unit 10 enters the wait state.

At time t6, an instruction to transfer a signal in the compressed second group (#2) is given to the video compression unit 20 and the video transmission unit 30. Compressed pictures are transferred from the video compression unit 20 to the video transmission unit 30. When transfer of a compressed video signal is complete at time t7, the same operation is repeated.

While the time required by the video input unit 10 to input pictures of one group is the same as the time required by the output buffer 23 to transfer compressed pictures of one group to the transmission buffer 31 in the foregoing example, it is possible to perform processing from input to transmission via the same procedure even in case theses times differ from each other.

As described earlier, according to this apparatus, same as the first embodiment, it is possible to reduce the operation performance required for video compression without increasing the time required for processing from input of pictures to transmission of pictures, thereby reducing the apparatus scale. According to this apparatus, it is not necessary to store the entire pictures to be compressed and transmitted. This is advantageous in that mass storage is omitted and thus the apparatus scale is further reduced.

THIRD EMBODIMENT

Figure 13:
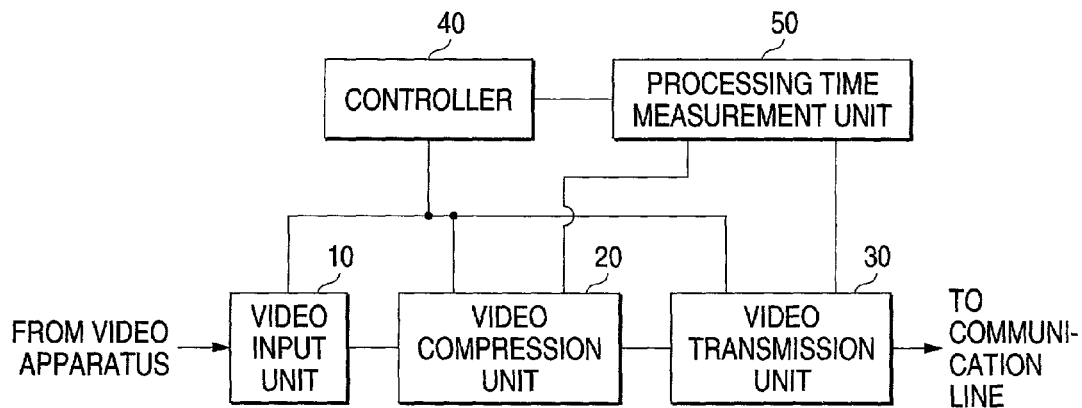
FIG. 13 is a general block diagram of the third embodiment.
Figure 14:
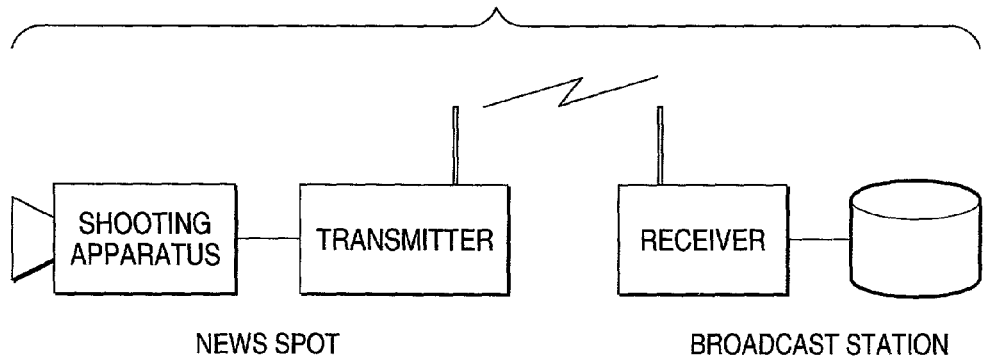
FIG. 14 shows the outline of a live video collection system.
Figure 15:
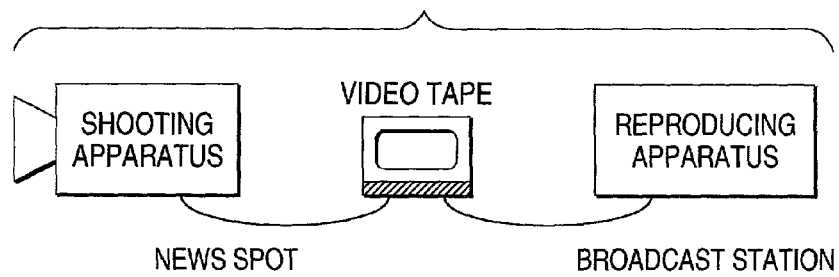
FIG. 15 shows the outline of a tape-based video collection system.

Video compression transmission apparatus according to the third embodiment of the invention allows change in at least either the compression encoding method via a video compression unit or the transmission method via a video transmission unit in the course of compression transmission. FIG. 13 is a general block diagram of video compression transmission apparatus according to the third embodiment of the invention. The video compression transmission apparatus differs from the video compression transmission apparatus in FIG. 1 in that a processing time measuring unit 50 is added.

The processing time measuring unit 50 is connected to a video compression unit 20 and a video transmission unit 30 and measures time required for video compression and video transmission per group. The compression time via the video compression unit 20 depends on the details of the picture to be compressed even when the compression ratio and compression details are the same. The transmission time via the video transmission unit 30 varies with the state of the communication line. The video compression transmission in FIG. 13 detects such variations and uses the optimum compression encoding method and transmission method to perform compression transmission.

Operation of this apparatus will be described. Flow of the entire processing by the apparatus is the same as the processing flow shown in the flowchart of FIG. 6. Operation of this apparatus differs from the operation according to the first embodiment is that processing is made while changing the operation of the video compression unit 20 or video transmission unit 30 depending on the processing time of the video compression unit 20 or video transmission unit 30. Adaptive methods for changing the operation depending on the processing time are threefold as described below. In this apparatus, one of the three adaptive methods or a combination thereof is used depending on the set conditions for a video signal to be transmitted in order to improve the operation efficiency of the apparatus or use efficiency of the communication line.

Adaptive Method 1

The first adaptive method changes the compression ratio of pictures in the video compression unit 20 depending on the measured compression and transmission times. The controller 40 recalculates the compression ratio for compressing next frame based on the measured compression time and transmission time and uses the resulting compression ratio in instructing compression of next frame.

Recalculation of the compression ratio is to make equal the time required for video compression and the time required for video transmission. When the time required for video compression is equal to the time required for video transmission, the video compression unit 20 and the video transmission unit 30 are always operating. This allows maximum use of apparatus resources and maximizes the processing efficiency per apparatus scale.

The compression ratio, or the bit rate R of a compressed video signal is calculated as in expression (1) assuming the time required for compression as $T_{comp}$, the time required for reproducing a target picture as $T_{play}$, and the effective transfer rate in video transmission as $R_{trans}$.

$$R = \frac{T_{comp}}{T_{play}} \cdot R_{trans} \quad (1)$$

Thus, by adapting the compression ratio to the processing time, it is possible to improve the apparatus resources, that is, the ratio of actual running time of apparatus to the wait time.

Adaptive Method 2

The second adaptive method changes the compression details of pictures in the video compression unit 20 depending on the measured compression and transmission times. The controller 40 selects the compression details for compressing next frame based on the measured compression time and transmission time and uses the resulting compression details in instructing compression of next frame. Change in the compression details is done via for example changing the range of motion vector explorations in motion estimation, presence/absence of filtering used in preprocessing, and/or change in the number of taps. In general, using a method that takes more time could improve the quality of a picture to be compressed.

In this way, by using the adaptive method, it is possible to perform a variety of processing in order to improve the quality of a compressed picture as long as a longer compression time is allowed. This performs a higher-quality video compression transmission without changing the processing time of the entire apparatus.

Adaptive Method 3

The third adaptive method changes the transmission method in the video transmission unit 30 depending on the measured compression and transmission times. The controller 40 selects the transmission method for next frame based on the measured compression time and transmission time and uses the resulting transmission method in instructing compression of next frame. Change in the transmission method is done for example by selection of a communication line to be used.

In case ISDN is used as a communication line, using two channels of ISDN boosts the transfer rate but doubles the communication cost. Thus, the controller 40 determines the transfer rate so that video transmission may be performed within the time equal to or shorter than the time required for compression of a video signal. For example, in case the time 50 times longer than the real time is required for transmission on a single channel, a single channel is used as a communication line when the time required for video compression is at least 50 times longer than the real time, and two channels are used when the time required for video compression is at least about 30 times longer than the real time.

In this way, by using this adaptive method, it is possible to reduce communication costs without decreasing the processing speed of the entire apparatus. The adaptive method may be used to select a communication line of a different medium, such as ISDN and satellite communications, as well as the number of ISDN channels.

The input unit, video input unit, video compression unit, video transmission unit, controller, and processing time measuring unit in the foregoing embodiments can be implemented via dedicated hardware and by using a computer running on programs. Some of these components can be implemented via dedicated hardware and the other components via a computer. In case at least some of the components are implemented via a computer, programs to implement the features of the input unit, video input unit, video compression unit, video transmission unit, controller, and processing time measuring unit may be circulated while recorded onto one or a plurality of electrically readable media or over a network. Each step in the twelfth through twenty-second aspects of the invention is executed by the dedicated hardware or the programs.

As understood from the foregoing description, according to the invention, it is possible to reduce the scale of apparatus required for video compression without increasing the time necessary for processing from input of pictures to compression of transmission. Control of other items, compression method and traffic volume are controlled depending on the transmission speed of a communication line and operation performance of apparatus. This upgrades the operation efficiency of apparatus and also upgrades picture quality or processing speed.

What is claimed is:

1. Video compression transmission apparatus for compressing a digital video signal and transmitting the resulting signal, comprising:
   a video compression unit for performing compression encoding on an input digital video signal;
   a video transmission unit for transmitting to outside the signal compression-encoded by the video compression unit via a communication line;
   a controller for controlling the operation of the video compression unit and the video transmission unit, wherein at least one of a compression encoding process via the video compression unit and a transmission process via the video transmission unit can be changed by the controller depending on set conditions for a video signal to be compression-encoded and depending on the output of the processing time measuring unit; and
   a processing time measuring unit for measuring the compression encoding time via the video compression unit and the transmission time via the video transmission unit,
   wherein the video compression unit and the video transmission unit are operated in parallel.

2. Video compression transmission apparatus for compressing a digital video signal and transmitting the resulting signal, comprising:
   a video compression unit for performing compression encoding on an input digital video signal;
   a video transmission unit for transmitting to outside the signal compression-encoded by the video compression unit via a communication line;
   a video input unit through which a digital video signal input to the video compression transmission unit is obtained,
   the video input unit comprising a video apparatus controller for supplying a digital video signal from external video apparatus to the video compression unit as required at a speed equal to or greater than the speed required for the compression encoding via the video compression unit;
   a controller for controlling the operation of the video compression unit, the video transmission unit and the video input unit, wherein at least one of a compression encoding process via the video compression unit and a transmission process via the video transmission unit can be changed by the controller; and
   a processing time measuring unit for measuring the compression encoding time via the video compression unit and the transmission time via the video transmission unit,
   wherein the video compression unit and the video transmission unit are operated in parallel.

3. A video compression transmission method for compressing a digital video signal and transmitting the resulting signal, comprising:
   a video compression step of performing compression encoding on an input digital video signal; and
   a video transmission step of transmitting to outside the signal compression-encoded by the video compression step via a communication line; and
   a processing time measuring step of measuring the compression encoding time via the video compression step and the transmission time via the video transmission step,
   wherein a controller controls the video compression step and the video transmission step, and the video compression step and the video transmission step are operated in parallel, and
   wherein at least one of a compression encoding process via the video compression step and a transmission process via the video transmission step can be changed by the controller depending on set conditions for a video signal to be compression-encoded and depending on the output of the processing time measuring step.

4. A video compression transmission method for compressing a digital video signal and transmitting the resulting signal, comprising:
   a video compression step of performing compression encoding on an input digital video signal; and
   a video transmission step of transmitting to outside the signal compression-encoded by the video compression step via a communication line;
   a processing time measuring step of measuring the compression encoding time via the video compression step and the transmission time via the video transmission step; and
   a video input step through which a digital video signal input is obtained, the video input step including a step of supplying a digital video signal from external video apparatus to the video compression step as required at a speed equal to or greater than a speed required for the compression encoding via the video compression step,
   wherein a controller controls the video compression step and the video transmission step, and the video compression step and the video transmission step are operated in parallel, and
   wherein at least one of a compression encoding process via the video compression step and a transmission process via the video transmission step can be changed.

* * * * *